United States Patent [19]

Hirasawa

[11] Patent Number: 5,418,638
[45] Date of Patent: May 23, 1995

[54] APPARATUS FOR DETECTING LIGHT FOCUS POSITION

[75] Inventor: Ken Hirasawa, Saitama, Japan

[73] Assignee: Fuji Xerox Co., Ltd., Tokyo, Japan

[21] Appl. No.: 207,093

[22] Filed: Mar. 8, 1994

[30] Foreign Application Priority Data

Mar. 9, 1993 [JP] Japan .................. 5-072835

[51] Int. Cl.⁶ ............................................. G02B 26/08
[52] U.S. Cl. ..................................... 359/197; 359/196; 359/217; 359/218
[58] Field of Search ................................ 250/234–236, 250/201.2–201.5; 359/196–197, 640, 204, 583, 217, 218

[56] References Cited

U.S. PATENT DOCUMENTS

| | | | |
|---|---|---|---|
| 4,311,384 | 1/1982 | Keene | 250/236 |
| 4,326,799 | 4/1982 | Keene et al. | 250/236 |
| 4,742,219 | 5/1988 | Ando | 250/201.5 |
| 4,773,053 | 9/1988 | Gottfried | 250/201.5 |
| 4,817,072 | 3/1989 | Toide et al. | 250/201.5 |
| 4,888,752 | 12/1989 | Arai | 250/201.5 |
| 4,943,155 | 7/1990 | Cross, Jr. | 359/640 |
| 5,233,188 | 8/1993 | Arimoto et al. | 250/235 |

FOREIGN PATENT DOCUMENTS 1-237614 9/1989 Japan .
4-155304 5/1992 Japan .

*Primary Examiner*—Loha Ben
*Assistant Examiner*—Steve Kong
*Attorney, Agent, or Firm*—Finnegan, Henderson, Farabow, Garrett & Dunner

[57] ABSTRACT

An apparatus is provided for detecting a light focus position of a scanning laser beam on a surface to be scanned. A laser beam splitting member splits part of the scanning laser beam, when the beam is scanning an unnecessary scanning area. A plurality of beamlets thus irradiate on a non-scanning direction line. A determination is made of an optical path differences between the split laser beamlets. Further, the spot size of each of the split beamlets is measured, thereby determining a split beamlet irradiating the surface to be scanned based on the spot size of each of the split beamlets.

9 Claims, 5 Drawing Sheets $IAth = IApeak \times \frac{1}{e^2}$ $IBth = IBpeak \times \frac{1}{e^2}$

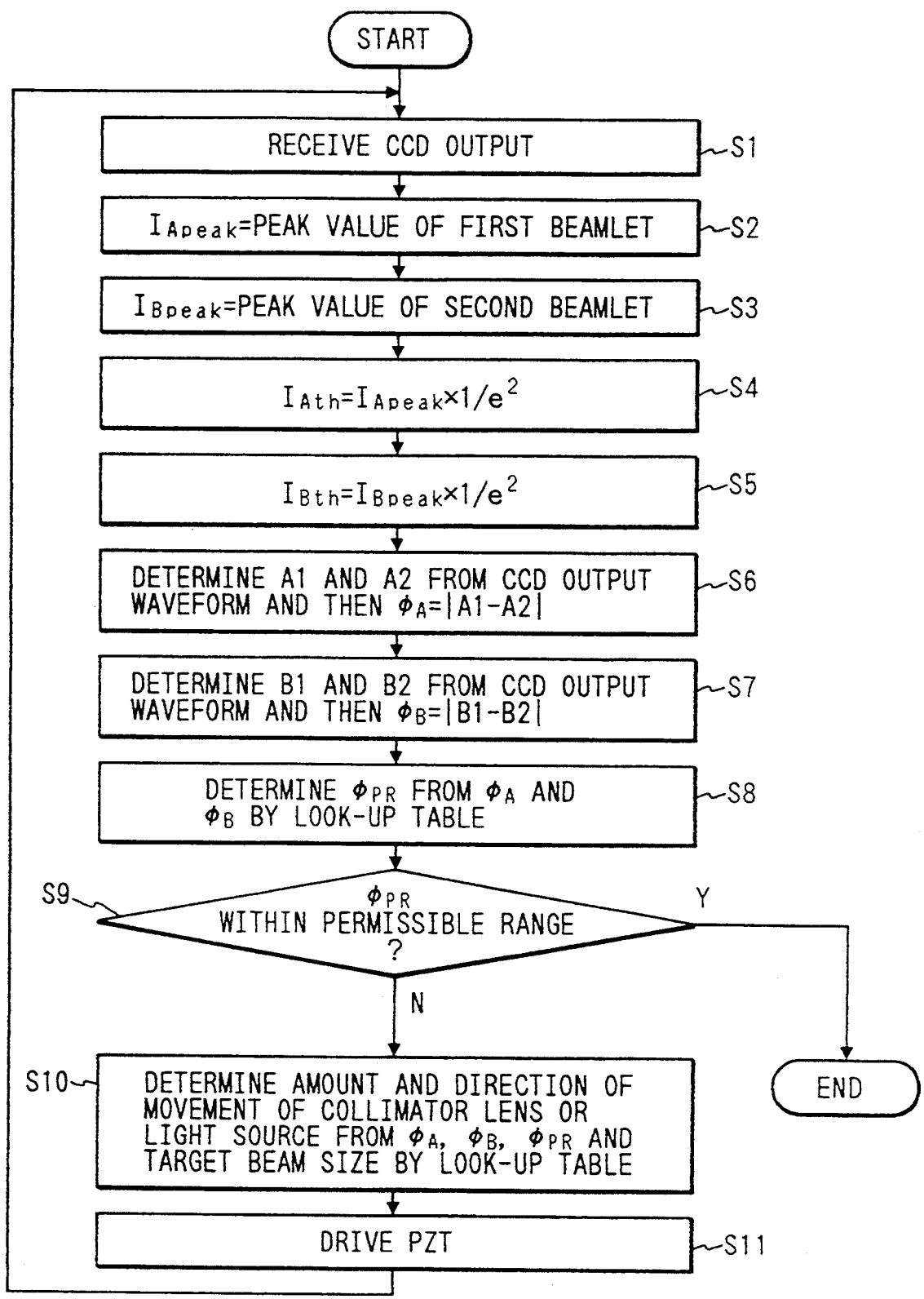

APPARATUS FOR DETECTING LIGHT FOCUS POSITION

BACKGROUND OF THE INVENTION

The present invention relates to an apparatus for detecting the light focus position, more particularly, to an apparatus for detecting the light focus position on an optical scanner in which the light beam as deflected by a rotating deflector is focused on the surface to be scanned.

Laser light as modulated by image information is deflected by a rotating polygonal mirror or other deflecting means and the deflected laser light is focused and scanned over a photoreceptor to form a latent electrostatic image on the latter. This operating principle is used in a common type of optical scanners such as a laser printer.

Unless the deflected laser light is in sharp focus on the photoreceptor, the optical scanner is unable to produce quality printing and, hence, focusing is an important consideration. Various proposals have heretofore been made in connection with the improvement in such focusing.

One of the proposals made to date is described in Unexamined Published Japanese Patent Application (kokai) No. Hei. 1-237614 and it relates to a technique in which two light detectors each having a slit are provided on an extension line of the surface to be scanned of the photoreceptor, one being in an upstream position and the other being downstream, and in which the laser beam is focused on said surface in response to a signal as detected with said light detectors.

Another proposal is described in Unexamined Published Japanese Patent Application (kokai) No. Hei 4-155304 and it relates to a technique in which two knife edges are provided on an extension line of the surface to be scanned of the photoreceptor, one being in an upstream position and the other being downstream, and in which the laser beam as cut with said knife edges is admitted by a light receiving element, with an output detection signal from said receiving element being differentiated to detect an offset in the focus position and an adjustment being subsequently made in such a way that the light beam will be properly focused on said surface to be scanned.

The first of the two conventional techniques just mentioned above requires two light detectors and it is necessary to provide slits of a smaller width than the incident light beam but this increases the chance of erroneous operation due to such reasons as the deposition of dust particles. As a further problem, the two light detectors must be provided in positions that are offset from the photodetector but which lie on the extension line of its surface to be scanned; to meet this requirement, a large space is necessary.

The second conventional technique uses only one light receiving element; on the other hand, the direction of offset in the focus position is detected by differentiated components of the detection signal and, as a result, any variations or the like in the characteristics of light detectors will make it impossible to adjust the light focus position with high accuracy.

SUMMARY OF THE INVENTION

An object, therefore, of the present invention is to solve the aforementioned problems of the prior art techniques by providing an apparatus that uses a single light detector and which yet is capable of detecting the light focus position with high precision.

Another object of the present invention is to provide an apparatus for detecting the light focus position that does not require a large space for installation of the light detector.

These objects of the present invention can be attained by an apparatus for detecting a light focus position of a scanning laser beam on a surface to be scanned, comprising: laser beam splitting means for splitting part of the scanning laser beam, at unnecessary area of the scanning, into a plurality of beamlets irradiating on a non-scanning direction line; optical path difference forming means for producing an optical path difference between the split laser beamlets; beam spot size measuring means for measuring the spot size of each of the split beamlets; and means for determining a split beamlet irradiating the surface to be scanned based on the spot size of each of the split beamlets.

In accordance with the present invention, the laser beam scanning over the surface to be scanned is split into a plurality of beamlets on the non-scanning direction and yet the spot diameter of each beamlet can be measured with a single light detector. Hence, the aforementioned problem with the variations in the characteristics of light detectors is eliminated, and the amount and direction of offset in the light focus position, as well as the scanning beam spot size can be detected precisely without unduly increasing the beam scanning width.

BRIEF DESCRIPTION OF THE DRAWINGS

FIG. 7 is a flowchart illustrating the operations of the computing circuit and the control circuit that are shown in FIG. 1.

DETAIL DESCRIPTION OF THE PREFERRED EMBODIMENTS

The present invention is described below in detail with reference to the accompanying drawings.

Figure 1:
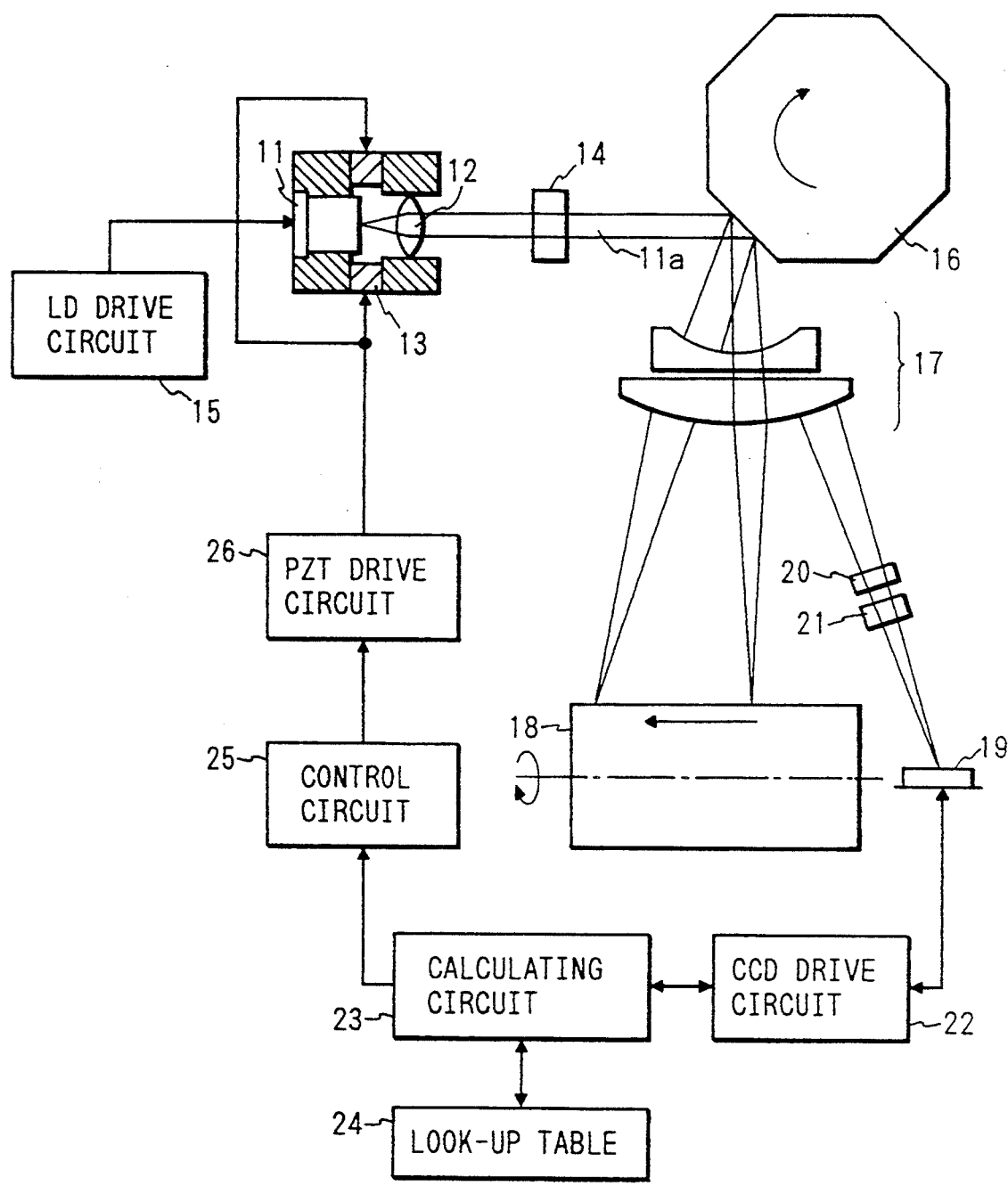
FIG. 1 is a diagram showing the general layout of an optical scanner in accordance with the present invention.

FIG. 1 is a diagram showing the general layout of an optical scanner that employs the concept of the present invention, showing a light source 11 that emits laser light; a collimator lens 12 for collimating the laser light emitted from the light source 11; PZT (piezoelectric device) 13; a lens 14; and a semiconductor laser drive circuit 15.

Further FIG. 1 discloses a rotating polygonal mirror 16 that deflects a laser beam 11a that has been collimated by the collimator lens 12; an fθ lens 17; a photoreceptor 18; a CCD array 19 that receives the laser beam 11a and which outputs a beam spot size detection signal; a quarter wavelength ($\frac{1}{4}\lambda$) plate 20; and a beam splitting and optical path difference generating means 21 that is the essential part of the present invention and which splits the laser beam 11a in the non-scanning direction to generate an optical path difference.

Further FIG. 1 discloses a CCD drive circuit 22; a computing circuit 23 that first determines the spot sizes of the laser beamlets incident on the CCD array 19 and which then determines the spot size of the laser beam on the scan surface (image plane) of the photoreceptor 18 by referring to a look-up table 24 that presents the relationship between the spot sizes of the laser beamlets incident on the CCD array 19 and the spot size of the laser beam on the scan surface (image plane) of the photoreceptor 18 in accordance with propagation characteristic and a positional relation between the image plane and CCD array; a control circuit 25 for outputting a control signal; and a PZT drive circuit 26.

Figure 2:
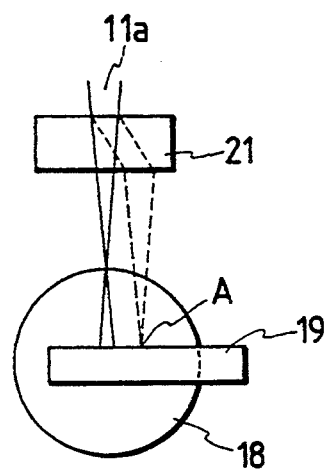
FIG. 2 is a side view showing how the beam splitting and optical path difference generating means and the CCD array in FIG. 1 look like if they are seen from its right side.

FIG. 2 is a side view showing how the beam splitting and optical path difference generating means 21 and the CCD array 19 look like if they are seen from the right side of FIG. 1. As can be seen from FIG. 2, the laser beam that has been split and provided an optical path difference by the means 21 is incident on the CCD array 19 in non-scanning position A which is offset from the scanning line. Hence, two values for the beam propagation characteristic are determined due to the outputs of the CCD array 19 corresponding to two optical path differences.

We next describe a first example of the present invention with reference to FIG. 3 as it relates to the beam splitting and optical path difference generating means 21 and the CCD array 19.

Figure 3A:
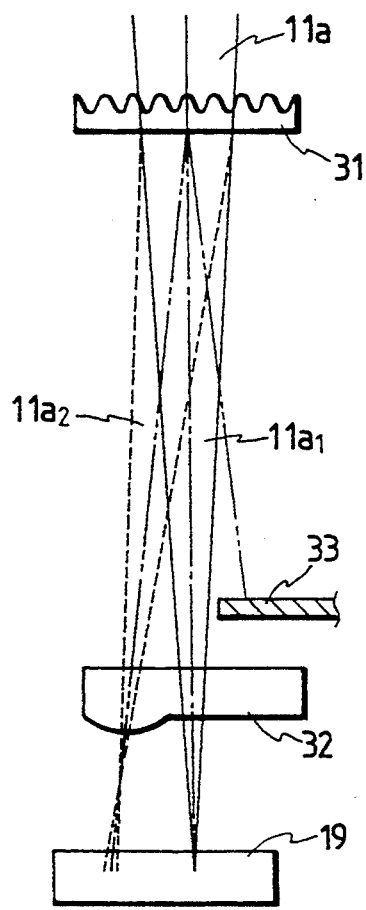
FIGS. 3(a) and 3(b) are diagrams illustrating the first example of the present invention.

FIG. 3(a) discloses a diffraction grating 31 for diffracting the laser beam; an optical path difference generator 32; and a light shielding plate 33. The laser light 11a that has passed through the $\frac{1}{4}\lambda$ plate 20 is split into two beamlets 11a1 and 11a2 by the grating 31. One beamlet 11a1 passes through the flat portion of the optical path difference generator 32 (i.e. consist of a glass) whereas the other beamlet 11a2 is converged by the lens portion of the optical path difference generator 32 to be incident on the CCD array 19.

As a result, the CCD array 19 will admit two beamlets 11a1 and 11a2 which are split and offset in the non-scanning direction.

Figure 3B:
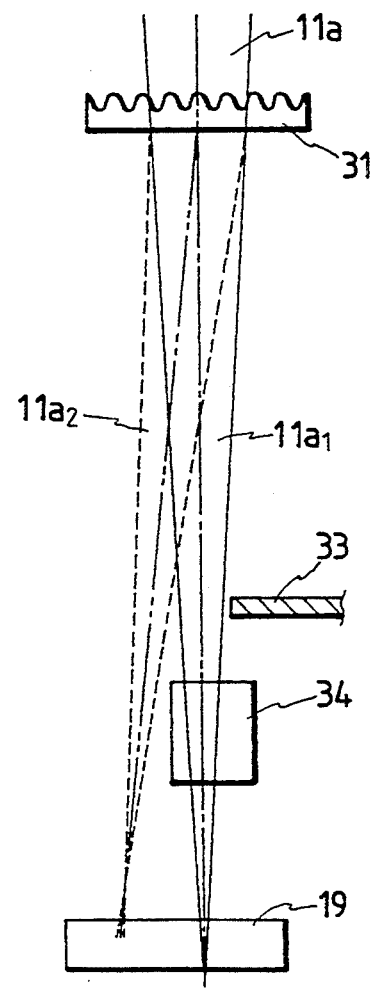

FIG. 3(b) shows a modification of FIG. 3(a), in which the beamlet 11a1 is admitted through a glass block 34 whereas the beamlet 11a2 is passed through air, thereby providing an optical path difference between the two beamlets. Details of FIG. 3(b) are the same in the other aspects as FIG. 3(a) and need not be described here.

Figure 4:
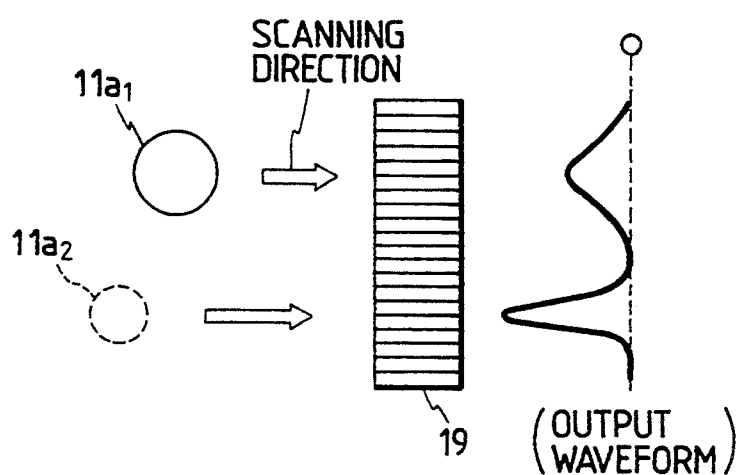
FIG. 4 is a diagram showing the waveforms of outputs from the CCD array.

FIG. 4 shows the waveforms of the outputs the CCD array 19 produces in response to the two incident beamlets 11a1 and 11a2. If the beamlet 11a1 of a large spot size due to great defocusing is incident, the CCD array 19 outputs; a waveform of low peak value; on the other hand, if the beamlet 11a2 of a small spot size due to small defocusing is incident, the CCD array 19 outputs; a waveform of high peak value.

In the first example, a single CCD array is used and this offers the advantage that the amount and direction of offset in the light focus position, as well as the spot diameter of laser beam can be detected precisely without unduly increasing the beam scanning width. As a further advantage, the beam splitting and optical path difference generating means can be composed of an inexpensive diffraction grating and glass.

Figure 5:
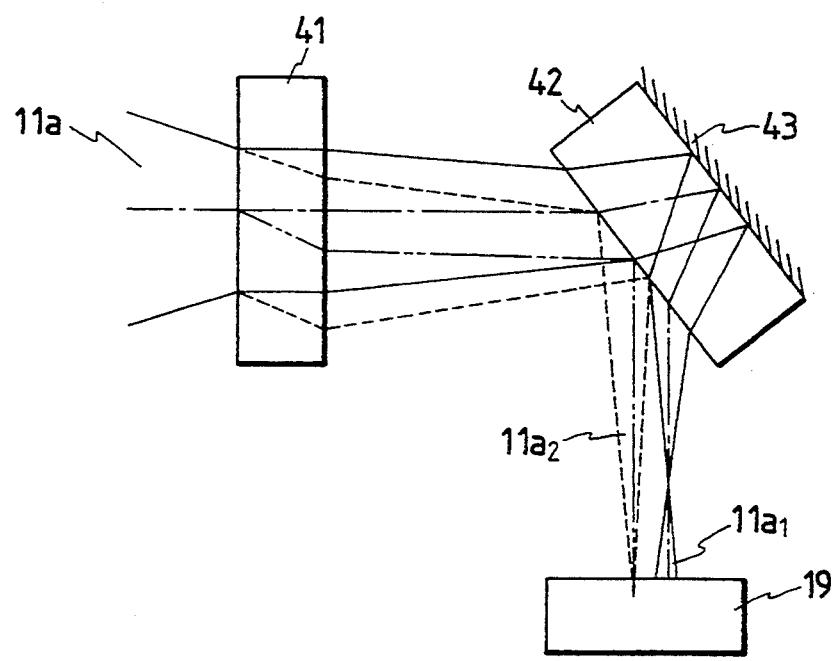
FIG. 5 is a diagram illustrating the second example of the present invention.

A second example of the present invention is next described with reference to FIG. 5. In this second example, the CCD array 19 is positioned perpendicular to the direction that is adopted in the case shown in FIG. 1. Shown by 41 is a birefringent member, 42 is a polarizer, and 43 is a reflecting surface.

As is well known, the birefringent member 41 produces different refractive indexes $n_e$ and $n_o$ depending upon the direction of the E (electric field) vector of a laser beam. Hence, the laser beam that has been transformed from linear polarization to circular polarization by means of the $\frac{1}{4}\lambda$ plate 20 is split into two beamlets 11a1 and 11a2 by passage through the birefringent member 41 before entering the polarizer 42. One incident beamlet 11a1 enters the polarizer 42 in accordance with the direction of its E vector and it is then reflected by the reflecting surface 43 to be launched into the CCD array 19. The other beamlet 11a2 is reflected by the surface of the polarizer 42 in accordance with the direction of its E vector, whereupon it illuminates the CCD array 19.

As a consequence, an optical path difference is created between the two beamlets 11a1 and 11a2, which are then launched into the CCD array 19 in light focus positions that are offset in the non-scanning direction.

In the second example, the polarizing characteristics of the laser beam are utilized and a single CCD array is used; this also offers the advantage that the amount and direction of offset in the light focus position, as well as the spot diameter of laser beam can be detected precisely without unduly increasing the beam scanning width. Further, the CCD array 19 can be mounted in a position distant from the beam scanning surface of the photoreceptor including its central axis and this offers the advantage of providing ease in system design and reducing the installation space.

Figure 6A:
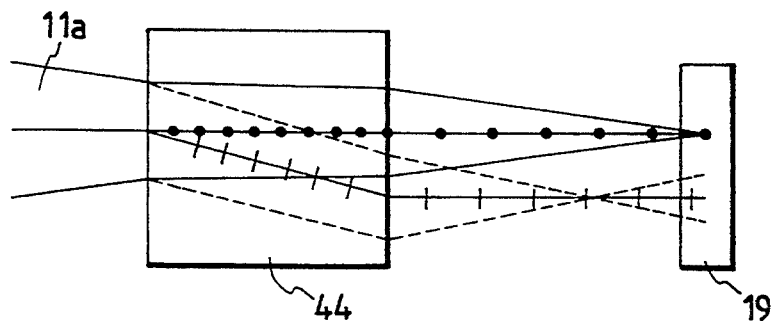
FIGS. 6(a) and 6(b) are diagrams illustrating the third example of the present invention.

A third example of the present invention is then described with reference to FIGS. 6(a) and 6(b). In the case shown in FIG. 6(a), a birefringent member 44 is used as the beam splitting and optical path difference generating means 21 shown in FIG. 1. As is clear from FIG. 6(a), laser beam 11a that has passed through the fθ lens 17 is split into two beamlets and given an optical path difference by the birefringent member 44 in accordance with its E vector and the two beamlets are then launched into the CCD array 19.

Figure 6B:
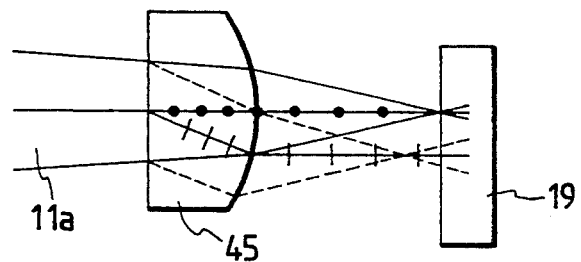

In the case shown in FIG. 6(b), laser beam 11a that has passed through the fθ lens 17 is split into two beamlets, given an optical path difference and converged by a convex surface of a birefringent lens 45 and the two beamlets are then launched into the CCD array 19.

This third example is advantageous over the second example in that it uses a smaller number of parts and that it yet is capable of precise detection of the amount and direction of offset in the light focus position, as well as the spot diameter of laser beam. The apparatus shown in FIG. 6(b) has the particular advantage that the distance between the birefringent lens 45 and the CCD array 19 is sufficiently reduced so as to realize a compact system.

Figure 8:
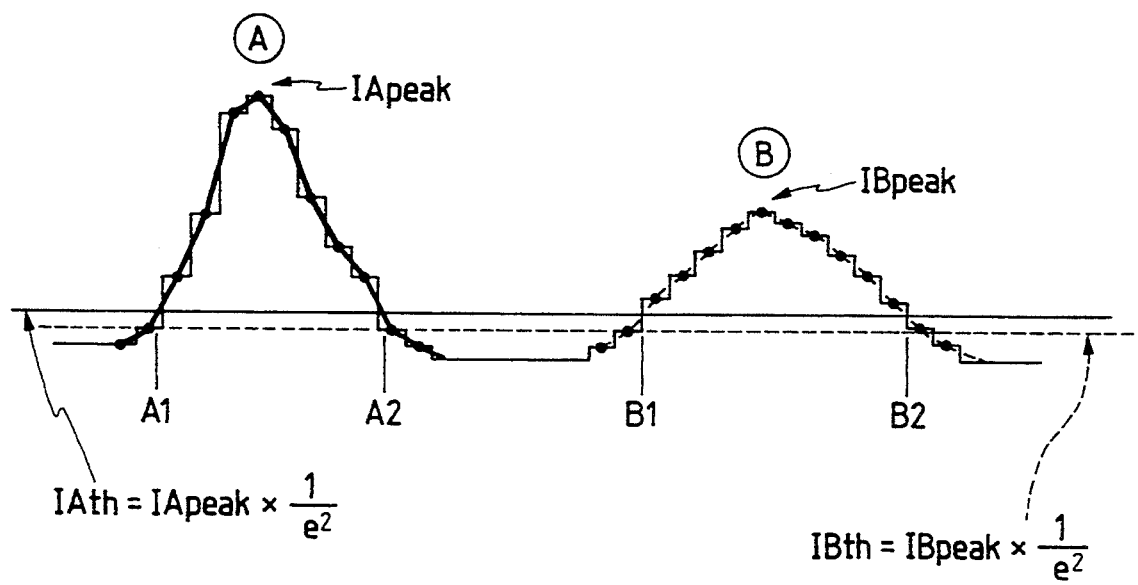
FIG. 8 is a diagram-illustrating how the widths of two beamlets can be determined.

The operations of the computing circuit 23 and control circuit 25 which are shown in FIG. 1 are next described below with reference to the FIG. 7 flowchart and the FIG. 8 waveform diagram. FIG. 8 is comparable to FIG. 4 in that it shows the waveform of an output detection signal from the CCD array 19. Indicated by "$I_{Apeak}$" (corresponding to beamlet 11a1) is the peak value of the first beamlet A and "$I_{Bpeak}$" (corresponding to beamlet 11a2) designates the peak value of the second beamlet B. Also indicated by "$I_{Ath}$" is the threshold value of the first beamlet A and "$I_{Bth}$" designates the peak value of the second beamlet B. The distance between A1 and A2 as determined by $I_{Ath}$ represents the spot diameter of the first beamlet A, whereas the distance between B1 and B2 as determined by $I_{Bth}$ represents the spot diameter of the second beamlet B.

In step S1 of the FIG. 7 flowchart, the computing circuit 23 receives the output of CCD array 19. In step S2, the circuit 23 determines the peak value of the first beamlet, $I_{Apeak}$, and in step S3, it determines the peak value of the second beamlet, $I_{Bpeak}$. Subsequently, in steps S4 and S5, the circuit 23 determines the threshold values of the first and second beamlets, $I_{Ath}$ and $I_{Bth}$, respectively, from the following equations noted in FIG. 8.

$$I_{Ath} = I_{Apeak} \times 1/e^2$$

$$I_{Bth} = I_{Bpeak} \times 1/e^2$$

In step S6, the circuit 23 determines the distance between A1 and A2 from the waveform of the output from CCD array 19 and the threshold value $1_{Ath}$, thereby determining a spot size $\phi_A$ of the first beamlet; in step S7, a spot size $\phi_B$ of the second beamlet is determined in a similar manner.

In step S8, the circuit 23 determines a spot size $\phi_{PR}$ of the beamlet on the surface to be scanned of the photoreceptor 18 with reference to the look-up table 24 in accordance with the spot sizes $\phi_A$ and $\phi_B$. In step S9, question is asked as to whether the spot size $\phi_{PR}$ is within a permissible range; if the answer is negative, the process goes on to step S10. In step S10, the circuit 23 also refers to the look-up table 24 to determine the amount and direction of movement of the collimator lens 12 or light source 11 from the $\phi_A$, $\phi_B$ and $\phi_{PR}$, as well as the target beam spot size. Subsequently, in step S11, the control circuit 25 activates the PZT drive circuit 26 so as to drive the PZT (piezoelectric device) 13.

If, as a result of the foregoing adjustment on defocusing, the answer to the question asked in step S9 becomes affirmative, the laser beam may be considered to have been brought into focus on the surface to be scanned of the photoreceptor 18, whereupon the operation of correcting the defocusing ends.

In the three examples described above, the laser beam scanning over the surface of the photoreceptor to be scanned is split into two beamlets in the non-scanning direction; it should, however, be noted that this is not the sole case of the present invention and the scanning laser beam may be split into three or more beamlets.

According to the present invention, the laser beam scanning over the surface to be scanned is split into a plurality of beamlets in the non-scanning direction and yet the spot diameter of each beamlet can be measured with a single light detector. Hence, the problem with the variations in the characteristics of light detectors is eliminated and the amount and direction of offset in the light focus position, as well as the scanning beam spot size can be detected precisely without unduly increasing the beam scanning width. As a further advantage, if the apparatus of the present invention for detecting the light focus position is assembled into a laser scanner, the beam spot on the surface to be scanned can be set for a desired size and the instrumental error in the laser scanner can be eliminated to insure the production of a beam spot size that is free from undesired variations.

If the apparatus is assembled into a laser scanner that is adapted for switching between a plurality of writing densities, one can set a beam spot size that complies with a designated writing density.

In addition, according to the present invention, the laser beam splitting means can be composed of an inexpensive diffraction grating.

Moreover, according to the present invention, the polarizing characteristics of laser light are utilized to compose the laser beam splitting means and the optical path difference forming means and, hence, the beam spot size measuring means can be mounted in a position distant from the beam scanning surface of the photoreceptor including its central axis and this offers the advantage of providing ease in system design and realizing a compact system.

Finally, according to the present invention, one can fabricate an apparatus for detecting the light focus position using a smaller number of components.

What is claimed is:

1. An apparatus for focusing a scanning laser beam on a surface to be scanned, comprising:
    laser beam splitting means for splitting part of said scanning laser beam, when said beam is scanning an unnecessary scanning area, into a plurality of beamlets irradiating on a non-scanning direction line;
    optical path difference forming means for producing an optical path difference between split beamlets;
    beam spot size measuring means for measuring the spot size of each of said split beamlets;
    means for determining a spot size of the scanning laser beam on the surface to be scanned based on spot sizes of said split beamlets; and
    means for adjusting the light focus position of the scanning laser beam based on said spot size of the scanning laser beam thus determined.

2. An apparatus according to claim 1, wherein said laser beam splitting means has a diffraction grating.

3. The apparatus according to claim 2, wherein said optical path difference forming means consists of a transparent material having different refractive indexes from atmosphere, said split beamlets through said diffraction grating being supplied different refractive indexes, respectively.

4. The apparatus according to claim 1, wherein said laser beam splitting means includes a birefringent member splitting said laser beam in accordance with different refractive indexes of the birefringent member.

5. The apparatus according to claim 4, wherein said birefringent member has a thickness thick enough to produce an optimum optical path difference between said split beamlets without said optical path difference forming means.

6. The apparatus according to claim 5, wherein said birefringent member has a convex emitting surface converging each split beamlet.

7. The apparatus according to claim 4, wherein said optical path difference forming means includes a polarizer reflecting one beamlet from said birefringent member at an inside bottom surface of the polarizer and reflecting another beamlet at an incident side surface of the polarizer so as to produce said optical path difference.

8. An apparatus according to claim 1, wherein said laser beam splitting means and said optical path difference forming means each have a polarizer.

9. The apparatus according to claim 1, wherein said beam spot size measuring means is a CCD array.

* * * * *